Sept. 6, 1960 P. J. H. JANSSEN ET AL 2,951,937

FREQUENCY DEMODULATOR

Filed Oct. 11, 1954

INVENTORS
PETER JOHANNES HUBERTUS JANSSEN
WOUTER SMEULERS

BY Fred M. Vogel
AGENT

United States Patent Office 2,951,937

Patented Sept. 6, 1960

2,951,937

FREQUENCY DEMODULATOR

Peter Johannes Hubertus Janssen and Wouter Smeulers, Eindhoven, Netherlands, assignors, by mesne assignments, to North American Philips Company, Inc., New York, N.Y., a corporation of Delaware Filed Oct. 11, 1954, Ser. No. 461,594

Claims priority, application Netherlands Oct. 21, 1953

17 Claims. (Cl. 250—27)

This invention relates to circuit arrangements for demodulating frequency-modulated input oscillations, comprising an amplitude limiter followed by a push-pull frequency demodulator comprising two resonant circuits, two rectifiers to which voltages derived from the said circuits are supplied with equal phase and in push-pull, and an output filter which is common to the said rectifiers and at which the demodulated signal is produced. The object of the invention is to provide a circuit arrangement in which the demodulated signal is highly insensitive to unwanted amplitude modulations of the input oscillations and which exhibits the characteristic that for further suppressing the sensitivity of the demodulated signal to unwanted amplitude modulations of the input oscillations, the amplitude modulations of the said voltages of equal phase and push-pull voltages derived from the limiter have opposite polarities.

In order that the invention may be readily carried into effect, it will now be described with reference to the accompanying drawing, given by way of example, in which.

Figures 1, 2, 3, 4:
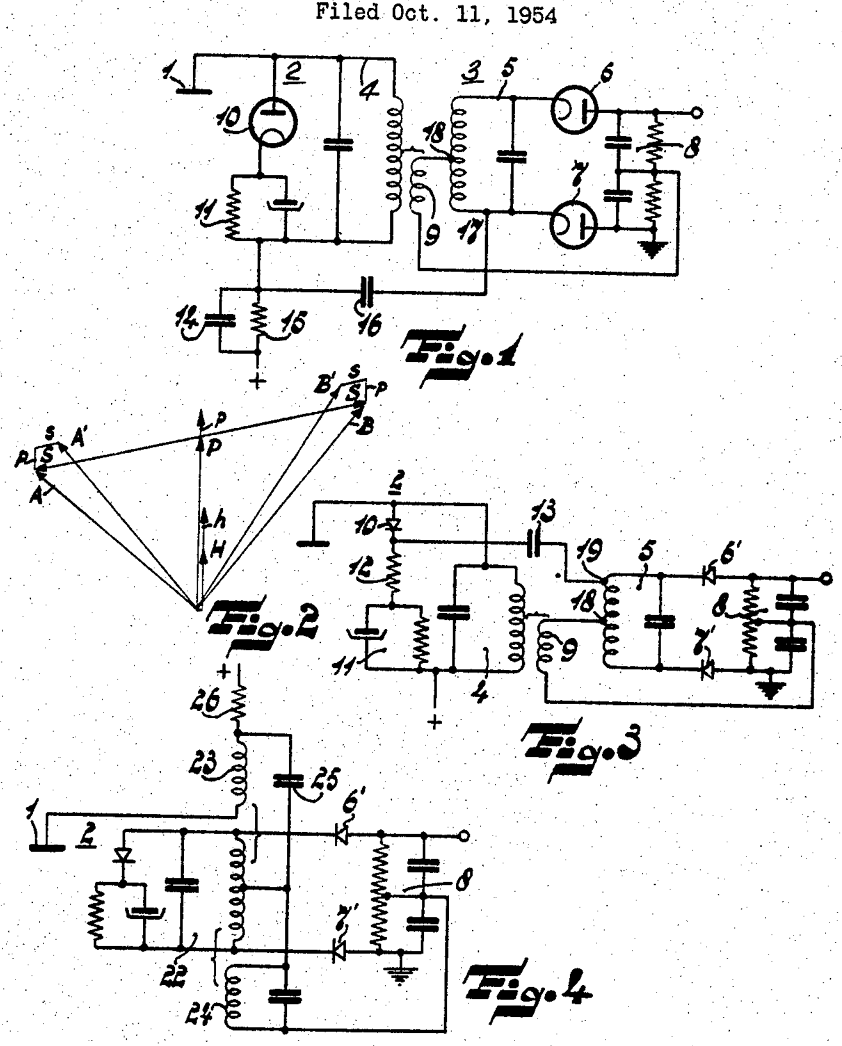
Fig. 1 shows one embodiment.
Fig. 2 shows a vector diagram which serves to explain the circuit arrangement of Fig. 1.
Fig. 3 shows a variation of Fig. 1.
Fig. 4 shows another variation of Fig. 1.

Referring now to Fig. 1, the frequency-modulated input oscillations produced in the output circuit of an intermediate-frequency amplifier 1 are supplied by way of a limiter 2 to a push-pull frequency demodulator 3 comprising a primary resonant circuit 4, a secondary resonant circuit 5, two rectifiers 6 and 7, and an output filter 8, across which the demodulated signal is produced in known manner in which the voltage across the primary circuit 4 is supplied by way of a tertiary winding 9 which is tightly coupled therewith, and the voltage across the secondary winding 5 is supplied, with equal phase and in push-pull, respectively, to the rectifiers 6 and 7.

The demodulated signal is zero and hence insensitive to the unwanted amplitude modulation of the input oscillations for the central frequency $f_0$ of the input oscillations, at which the said voltages of equal phase and push-pull voltages relatively differ in phase by 90°. However, in the case of a frequency sweep of the input oscillations, the demodulated signal varies in conventional circuit-arrangements in proportion with the amplitude modulation of the input oscillations, so that means must be resorted to for suppressing the amplitude modulation of the FM signal as much as possible beforehand with the use of a limiter.

The invention recognizes the fact that, when use is made of a non-ideal limiter, it is possible for the residual amplitude modulation to be made inactive in a simple manner by deriving voltages from the limiter such that the amplitude modulation of the voltage P supplied via the winding 9 with equal phase to the rectifiers 6 and 7 (see Fig. 2) has a polarity opposite to that of the voltages S supplied via the circuit 5 in push-pull to the rectifiers 6 and 7 (see Fig. 2).

For this purpose an inductive coupling between the circuits 4 and 5 is avoided in Fig. 1, the output circuit of the amplifier 1 including a small resistor 15, of which the voltage thereacross is supplied by way of a small capacitor 16 to one extremity 17 or, if desired, to a tap (not shown) on the inductance of the circuit 5. The winding 9 is wound in a direction such that between the extremity 17 and the center 18 of the secondary circuit 5 there is produced a voltage S (see Fig. 2) having a phase shift dependent upon frequency and of which the amplitude is proportional to the difference between the voltage P (see Fig. 2) set up across the winding 9 and the voltage H set up across the resistor 15 (it is to be considered that the lower ends of the winding 9 and of the resistor 15 are connected together with respect to the frequency of the input oscillations).

Since as a result of the presence of limiter 2, the voltage P across the winding 9 is modulated less in amplitude than is the voltage H across the resistor 15, an adjustment is possible, at which upon increase of the voltage H by a value $h$ (shown on an exaggerated scale in Fig. 2), the voltage P, which is greater than the voltage H, is increased by a value $p$, which is smaller than $h$, so that the voltage S decreases by a value $s$, in other words an adjustment at which the amplitude modulations of the voltages P and S have opposite polarities. If desired, the resistor 15 may be bridged by a small capacitor 14 to permit accurate adjustment of the phases of the voltages P and S.

Consequently, resultant voltages A′ and B′ instead of A and B are supplied to the rectifiers 6 and 7, it being possible for the increases in length A′—A and B′—B to be exactly the same with suitable proportioning, so that the said increases in length exactly neutralize one another in the corresponding voltages across the output filter 8. For this purpose, according to calculation, it is necessary to fulfil the condition $$\frac{p}{s}=\frac{P^3}{S^3}$$

which condition holds good substantially independently of the frequency sweep of the input oscillations. If, however, the direction of passage of the rectifiers 6 and 7, or that of the limiter rectifier 10, or the winding direction of the winding 9 is reversed, then furthermore the deformation of the voltage across the circuit 4 materially influences the amplitude modulation of the voltages A and B at the rectifiers 6 and 7, in which event the above-mentioned condition no longer holds good.

Fig. 3 illustrates another way in which the amplitude modulation of the voltages S supplied in push-pull to the rectifiers 6′ and 7′ may be given a polarity opposite to that of the voltage P supplied with equal phase to the rectifiers 6′ and 7′. For this purpose, as before, an inductive coupling between the circuits 4 and 5 is avoided, and the limiter 2 is of the type known per se, a rectifier 10 in series with an RC-filter 11 having a time-constant greater than the cycle of the lowest modulation frequency being connected in parallel with the primary circuit. The voltage P across the tertiary winding 9 is supplied as before, to the center 18 of circuit 5 and the voltage H produced across a small resistor 12 connected in series with the bias RC-filter 11 is suppled by way of a small capacitor 13 to a tap 19 on the circuit 5. Since the first-mentioned voltage P is higher as before but modulated less in amplitude than the voltage H, it is possible, as before, to obtain S, of which the amplitude modulation is opposite to that of P, so that with suitable proportioning the demodulated voltage set up across the output filter 8 becomes insensitive to said amplitude modulation.

Fig. 4 shows a circuit arrangement in which the amplitude modulation of the voltage supplied with equal phase to the rectifiers 6′ and 7′ is opposite to that of the voltages supplied in push-pull to the rectifiers 6′ and 7′. The latter voltages are produced across a primary resonant circuit 22 which is bridged by the limiter 2 and which is tightly coupled to a winding 23 included in the output circuit of the amplifier 1 and which is substantially critically coupled to a secondary resonant circut 24. The circuit 24 is connected between the center of the output filter 8 and the center of the circuit 22 and the latter point has also supplied to it, by way of a small capacitor 25, the voltage across a small resistor 26 included in the output circuit of amplifier 1. This small voltage is in phase opposition to the higher voltage set up across the circuit 24 by the coupling with the circuit 22 and has a higher modulation depth than the said voltage, so that the difference between these voltages, which is supplied with equal phase to the rectifiers 6′ and 7′, exhibits an amplitude modulation opposite to that of the voltage across the circuit 24, so that by suitable proportioning the demodulated signal produced across the filter 8 may, as before, be insensitive to the said amplitude modulations.

It has been found that the described circuit arrangements permit the attainment of very satisfactory amplitude modulation-suppression factors, for example, from 60 to 70 times, while being relatively little sensitive to tolerances of the circuit elements used, more particularly of the rectifiers. This is in contradistinction with, for example, a ratio detector, with respect to which further advantages are obtained in that the output signal with unvaried bandwidth is higher by a factor of 2 and in that even for high central frequencies, for example, 33 megacycles, with the use of simple coils a demodulator of small bandwidth, for example, 200 kilocycles, may be realised, since for obtaining satisfactory suppression of amplitude modulation in ratio detectors the natural damping of the secondary circuit is required to be low with respect to the damping introduced by the rectifiers, so that the bandwidth of the secondary circuit is always comparatively large. For the same reason, the limiter 2 in the circuit arrangement under consideration is invariably connected in parallel with the circuits 4 and 22 and not in parallel with the circuits 5 and 24.

Figure 5:
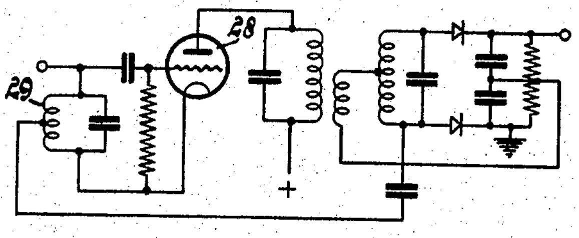
Fig. 5 shows one more variation of Fig. 1.

It will be evident that other limiters may alternatively be used, for example, a grid-current amplitude limiter 28 as shown in Fig. 5, it being possible for the voltage H of great modulation depth to be derived from the input circuit 29 of the limiter as shown. The operation of this circuit arrangement is otherwise similar to that of Fig. 1.

In one practical embodiment the circuit elements, for example, those of Fig. 1, had the following values:

Filter 8=two 82,000 ohm resistors and two 56 micromicrofarad condensers, filter 11=47,000 ohms and 5 microfarads, resistor 15=1 to 5 thousand ohms, capacitor 16=6.8 micromicrofarads, amplitude suppression factor of limiter 2=from 6 to 10 times, voltage P across winding 9=voltage S across each half of circuit 5=⅓ times the voltage across circuit 4=from 3 to 5 times the voltage across resistor 15, total amplitude suppression factor=more than 50 times.

While preferred embodiments of the invention have been shown and described, various other embodiments and modifications will appear to those skilled in the art, and will fall within the scope of invention as defined in the following claims.

What is claimed is:

1. A circuit arrangement for demodulating frequency-modulated input oscillations having an amplitude subject to amplitude-modulation, comprising a source of said input oscillations, an amplitude limiter connected to receive said modulated oscillations and to provide a partial suppression of said amplitude modulation, and a frequency demodulator connected to said amplitude limiter to receive the partially amplitude modulated suppressed oscillations as well as part of said input oscillations and comprising two rectifiers, a first resonant circuit connected to feed the modulated oscillations to said rectifiers in equal phase and with a given polarity of amplitude modulation, a second resonant circuit connected to feed the modulated oscillations to said rectifiers in push-pull and with a polarity of amplitude modulation opposite to said given polarity, and an output filter connected in common to said rectifiers.

2. The circuit arrangement as claimed in claim 1, including means connected to said source of input oscillations to derive an amplitude-modulated signal therefrom having an amplitude which is smaller but an amplitude modulation which is larger than that of said partially amplitude modulated suppressed oscillation, and means connected to feed said derived signal to one of said resonant circuits.

3. The circuit arrangement as claimed in claim 2, in which said amplitude limiter comprises a rectifier and said means to derive an amplitude-modulated signal comprises an impedance connected in series with said rectifier.

4. The circuit arrangement as claimed in claim 2, in which said first resonant circuit is connected to said amplitude limiter and said second resonant circuit includes a center tap, and including a coupling winding coupled inductively to said first resonant circuit and connected electrically to said center tap, said derived signal being fed by said last-named means to a point on said second resonant circuit.

5. A circuit arrangement for demodulating frequency-modulated input oscillations, comprising a source of said input oscillations, an amplitude limiter connected to said source and comprising the series connection of a rectifier, a signal-deriving impedance and a bias voltage filter consisting of the parallel combination of a resistance and a capacitor, a first resonant circuit connected across said rectifier and bias voltage source, a pair of demodulator rectifiers, a second resonant circuit having a center tap and having ends thereof connected respectively to input terminals of said demodulator rectifiers, a center-tapped output filter connected between output terminals of said demodulator rectifiers, a coupling coil inductively coupled to said first resonant circuit and having ends thereof connected respectively to said center taps, and signal-conductive means connected between a point on said second resonant circuit and the junction of said bias voltage source and said signal-deriving impedance.

6. A circuit arrangement for demodulating frequency-modulated input oscillations, comprising a source of said input oscillations, an amplitude limiter connected to said source and comprising a rectifier, signal-deriving impedance, and bias voltage filter connected in series combination, a first resonant circuit connected across said series combination, a pair of demodulator rectifiers, a second resonant circuit having a center tap and having ends thereof connected respectively to input terminals of said demodulator rectifiers, a center-tapped output filter connected between output terminals of said demodulator rectifiers, a coupling coil inductively coupled to said first resonant circuit and having ends thereof connected respectively to said center taps, and signal-conductive means connected between a point on said second resonant circuit and the junction of said rectifier and said signal-deriving impedance.

7. A circuit arrangement for demodulating frequency-modulated input oscillations, comprising a source of said input oscillations having an output circuit comprising an inductor connected in series with a resistor, a center-tapped first resonant circuit coupled inductively to said inductor, an amplitude limiter connected in parallel with said first resonant circuit, a pair of rectifiers having input terminals connected respectively to the ends of said first resonant circuit, a center-tapped output filter connected between output terminals of said rectifiers, a second resonant circuit inductively coupled to said first resonant circuit and having ends thereto connected respectively to said center taps, and signal-conductive means connected between the center tap of said first resonant circuit and the junction of said inductor and said resistor.

8. The circuit arrangement as claimed in claim 7, in which said first resonant circuit is tightly coupled to said inductor and said second resonant circuit is substantially critically coupled to said first resonant circuit.

9. A circuit arrangement for demodulating frequency-modulated input oscillations, comprising a source of said input oscillations, a grid-current amplitude limiter tube having an input grid connected to receive said input oscillations and having an output electrode, a first resonant circuit connected to said output electrode, a pair of rectifiers, a second resonant circuit having a center tap and having ends thereof connected respectively to input terminals of said rectifiers, a center-tapped output filter connected between output terminals of said rectifier, a coupling coil inductively coupled to said first resonant circuit and having ends thereof connected respectively to said center taps, a third resonant circuit connected to receive said input oscillations, and signal conductive means connected between points on said second and third resonant circuits.

10. A circuit arrangement for demodulating frequency-modulated input oscillations, comprising an amplitude limiter connected to receive said oscillations and produce amplitude-limited oscillations therefrom, a push-pull frequency demodulator connected to the output of said limiter and comprising two rectifiers, a first resonant circuit connected to derive a modulated signal from said amplitude-limited oscillations and apply said modulated signal to said rectifiers in equal phase, a second resonant circuit connected to derive a modulated signal from said amplitude-limited oscillations and apply the last-named modulated signal to said rectifiers in push-pull, and an output filter connected in common to said two rectifiers, and means for additionally suppressing the sensitivity of the demodulated signal to amplitude modulation of said input oscillations comprising means connected to reverse the effective polarity of the amplitude-modulated component of the modulated signal derived from one of said resonant circuits whereby the amplitude modulations of the signals applied to said rectifiers in push-pull and in equal phase, respectively, have opposite polarities.

11. A circuit arrangement as claimed in claim 10, in which the last-named means comprises a signal adding circuit connected to add in phase opposition to one of said derived signals a compensating signal derived from said input oscillations and having a lower signal amplitude and a greater amplitude-modulation component than said one derived signal.

12. A circuit arrangement as claimed in claim 11, comprising means coupling said first and second resonant circuits together non-inductively, a coupling winding coupled to said first resonant circuit and connected to the electrical center of said second resonant circuit, and in which said signal adding circuit comprises means connected to feed said compensating signal to a point on said second resonant circuit other than the electrical center thereof.

13. A circuit arrangement as claimed in claim 11, in which said first and second resonant circuits are inductively coupled together and one of said resonant circuits is connected to the electrical center of the other said resonant circuit thereby forming a junction, and means connected to apply said compensating signal to said junction.

14. A circuit arrangement as claimed in claim 11, in which said amplitude limiter comprises a series-connected combination of a rectifier and a parallel-connected resistance and capacitance having a time constant larger than the period of the lowest modulation frequency of said input oscillations, said first resonant circuit being connected in parallel combination with said series combination, and in which said signal adding circuit comprises an impedance connected in the path of at least one of said oscillations whereby said compensating signal is produced in said impedance.

15. A circuit arrangement as claimed in claim 14, in which said impedance is connected at an end thereof to ends of said parallel-connected resistance and capacitance.

16. A circuit arrangement as claimed in claim 14, in which said impedance is interposed between said rectifier and said parallel-connected resistance and capacitance.

17. A circuit arrangement as claimed in claim 10, in which the opposite-polarity amplitude modulations of the signals applied to said rectifiers in equal phase and in push-pull, respectively, differ in amplitude by a ratio substantially equal to the third power of the quotient of the amplitudes of said signals.

References Cited in the file of this patent

UNITED STATES PATENTS

| | | |
|---|---|---|
| 2,282,105 | Tunick | May 5, 1942 |
| 2,379,688 | Crosby | July 3, 1945 |
| 2,379,764 | Thomas | July 3, 1945 |
| 2,714,157 | Boelens | July 26, 1955 |

FOREIGN PATENTS

| | | |
|---|---|---|
| 490,677 | Canada | Feb. 17, 1953 |